UNITED STATES PATENT OFFICE 2,301,986

PLASTIC ACOUSTIC PULP

Mario Valdastri, Honolulu, Territory of Hawaii

No Drawing. Application February 16, 1940,
Serial No. 319,363

1 Claim. (Cl. 106—122)

My invention relates to a composition to be used as a building plaster.

An important object of my invention is to provide a building plaster of the above mentioned character, which when applied to the walls or ceilings of a room, auditorium, church or other enclosed building, serves to absorb and deaden sounds, noises and reverberations to insure better and more efficient acoustics.

A further object of the invention is to provide a composition of the above mentioned character, which when rendered plastic by the addition of a suitable amount of water, may be applied with a trowel or like tool as plaster to the walls and ceilings, and which is readily workable and adheres to the walls and ceilings with permanent tenacity.

A further object of the invention is to provide a composition of the above mentioned character which when applied to a wall or ceiling as plaster has a high efficiency of sound absorption.

A further object of the invention is to provide a composition of the above mentioned character, which will have a retarded or delayed effervescing action, whereby the troweling or working of the plastic composition may be completed before the effervescing action substantially starts, so that the mass will become properly levitated, after application and before drying and will therefore possess and retain its proper cellular structure.

A further object of the invention is to provide a composition of the above mentioned character having when plastic an increased plasticity and workability and an increased porous or coarser texture, yet will possess the desired strength, resiliency and pliability, when dry.

This application is a continuation in part of my application for Plastic acoustic pulp, filed August 23, 1937, Serial No. 160,555.

My composition may comprise the following ingredients:

1. Cellulose $(C_6H_{10}O_5)_n$, finely divided or mangled and cleaned. I also prefer to bleach this cleaned mangled cellulose as it produces a pulp or mass having a whiter finish. This cellulose for practical purposes is used in the form of cotton fiber or other vegetable refuse such as bagasse, sawdust, bark, cotton hulls, grain chaff, corn trimmings, straw, etc.

2. Fibered or divided asbestos.

3. Finely divided, powdered or granular titanium oxide ($TiO_2$).

4. Finely divided or powdered dry soap.

5. Finely divided, powdered or granular copper sulphate or aluminum sulphate. Copper sulphate is preferred as it is an important factor in preventing molding and fungus growth, where dampness prevails. The copper sulphate definitely retards mold or fungus growth which is apt to appear in plaster or pulps containing cellulose or vegetable fibers, when the plaster is applied wet and further when the plaster is subjected to exterior sources of dampness.

6. A binder. I use a water soluble binder of any suitable character, which will hold the several constituents of the composition together. As a binder I may use dextrin, casein, albumin, glue, or an adhesive prepared from corn or wheat flour, such as is used in the hanging of paper The binder is preferably dry and finely divided, powdered or granular.

7. A slowly reacting acidic material. This acid may be tartaric acid ($C_4H_6O_6$) or cream of tartar, acid potassium tartrate ($C_4H_5O_6K$). The acid material may also be alum $K_2Al_2(SO_4)$ or calcium acid phosphate $CaH_4(PO_4)_2$. When a dry mixture is produced, the acidic material is dry and is finely divided, powdered or granular.

8. A slowly reacting alkaline material. This material may be calcium carbonate, chalk ($CaCO_3$) or sodium bicarbonate ($NaHCO_3$).

The divided cellulose and divided asbestos constitutes the major portion of the bulk of the mass. The titanium oxide imparts to the plastic mass or pulp, when incorporated with a suitable amount of water, an increased plasticity and workability. When the pulp dries, it will be found that the titanium oxide imparts thereto a more porous or coarser texture while also serving as a strengthening material, without sacrificing the desired softness, resiliency or pliability of the dried mass. I have discovered after intensive research, that by adding finely divided or powdered dry soap to the mass, a decided improvement in the coefficient of absorption of the applied plaster is accomplished. Further, the added finely divided or powdered dry soap greatly improves the finished texture and ease of manipulation and application of the plastic mass with the added water. The addition of the finely divided or powdered dry soap has a decided ebullient effect upon the mixture and this ebullient condition remains until the thorough drying process of the applied plaster is completed, at which time the bubbles burst through the entire mass and impart a permanent and uniform porosity to the finished plaster. The acidic material and the alkaline material, have a slow reaction with each other, to liberate gas, carbon dioxide, to render the mass cellular or light.

Any suitable color pigment can be added to meet the individual requirements.

One preferred dry composition embodying my invention contains the following ingredients combined in the proportions stated.

1. Mangled cellulose_____cubic feet__ 6
2. Fibered asbestos_____do____ 1
3. Divided titanium oxide_____pounds__ 1
4. Finely divided or powdered dry soap
   ounces__ 4
5. Divided copper sulphate_____pounds__ 1
6. Divided dry water soluble binder____do____ 5
7. Divided cream of tartar_____ounces__ 3
8. Divided bicarbonate of soda_____do____ 3

The several ingredients thus combined are thoroughly mixed and produce a dry fibrous mass, prior to the addition of water, in a suitable amount to render the same plastic for troweling or working.

The proportions of the ingredients set forth in the table are the preferred proportions, but they may be varied. The employment of six cubic feet of cellulose to one cubic foot of asbestos, may be varied if one uses cellulose in its cotton form or cellulose in sawdust form. Whatever form of cellulose is employed, it should be thoroughly mangled or divided and cleaned and preferably bleached. The proportion of the finely divided powdered dry soap may be varied within wide limits, but I have found that the best results are obtained by the addition of four (4) ounces of the soap with respect to the proportions of the other ingredients. With regard to the use of a binder, I contemplate using in combination with the other ingredients any water soluble binder and do not restrict myself to the use of dextrin, as the other binders recited may be employed. When it is desired to apply the composition as a plaster, an average of five gallons of water is added to one cubic foot of the dry composition. When the water is added to the dry mix, as above indicated, it produces a plastic mass. When the water is added to the dry mix the entire mass should be thoroughly agitated either manual or mechanical. The powdered soap in the presence of the water and agitation, lightens and makes the mass far more workable. By the agitation, the ebullient effect of the powdered soap and water is decidedly noticeable, and further, the main advantage of the added powdered soap is the further retarding of the final expulsion and dissipation of the gas generated by the effervescent action of tartaric acid and calcium carbonate. The tartaric acid and calcium carbonate produce a delayed generation of gas, but the ultimate release and expulsion of this gas into the atmosphere is further delayed by the formation of minute soap bubbles in the plastic mix, due to agitation, and these minute soap bubbles envelop the gas therein, retaining the gas therein for practically the entire drying period of the pulp. At about the end of the drying period the bubbles break and the gas is released. The release of the gas further adds a leavening effect to the finished plaster and its acoustical efficiency is further increased.

The entire mass, after agitation, is plastic and is applied by a trowel to the wall and ceilings in the same manner as ordinary plaster.

Instead of employing the dry acidic and alkaline material to produce the liberated gas, in a retarded manner, these may be omitted, and at the time of mixing the dry mass with the water, I then add 5 teaspoonsfull of a concentrated water solution of ammonia for each cubic foot of the dry mass, which is 1 teaspoonful of the ammonia solution for each gallon of water. The ammonia solution, at a moderate temperature, slowly gives up the ammonia gas.

The effervescent producing agents which I employ, produce a delayed or retarded effervescence and levitation of the mass, approximately four hours after the mass is plasticized by the water. In accordance with my composition, the effervescing does not start to any considerable extent, until long after the working or troweling has been completed, and after the plasticized mass is in place upon the wall and is relieved from the working pressure. The effervescing action then renders the applied plastic mass properly porous or cellular. It should also be noted that my composition stiffens to the desired extent, although it always remains relatively flexible and resilient, by the drying action of the mass and the evaporation of the water content, and never becomes rigid nor sets as plasters containing lime, cement or the like, which crystallize upon setting.

Having thus described my invention, what I claim is:

A dry fibrous mass to be combined with water for producing a plaster for absorbing and deadening sounds, said mass comprising substantially six cubic feet of mangled cellulose having a density caused by the weight of the cellulose alone, one cubic foot of fibered asbestos having a density caused by the weight of the asbestos alone, one pound of divided titanium oxide, four ounces of divided dry soap, one pound of divided copper sulphate, five pounds of dry water soluble binder, three ounces of cream tartar, and three ounces of bicarbonate of soda.

MARIO VALDASTRI.